United States Patent
Sajczvk et al.

[11] Patent Number: 5,141,475
[45] Date of Patent: Aug. 25, 1992

[54] BELT TENSIONING METHOD

[75] Inventors: Andrzej Sajczvk; Jerzy Otremba; Henry W. Thomey, all of Windsor, Canada

[73] Assignee: Gates Power Drive Products, Inc., Bloomfield Hills, Mich.

[21] Appl. No.: 788,669

[22] Filed: Nov. 6, 1991

Related U.S. Application Data

[62] Division of Ser. No. 588,633, Sep. 26, 1990, Pat. No. 5,098,347.

[51] Int. Cl.$^5$ .............................................. F16H 7/08
[52] U.S. Cl. ..................................... 474/135; 474/117
[58] Field of Search ........................ 474/101, 109–111, 474/113–117, 133, 135, 136, 138

[56] References Cited

U.S. PATENT DOCUMENTS

| | | | |
|---|---|---|---|
| 4,077,272 | 3/1978 | Buss | 474/135 X |
| 4,144,772 | 3/1979 | Brackin et al. | 474/135 |
| 4,299,584 | 11/1981 | Sproul | 474/135 |
| 4,500,303 | 2/1985 | Sermersheim et al. | 474/135 X |
| 4,822,322 | 4/1989 | Martin | 474/135 |
| 4,883,446 | 11/1989 | Mitchell et al. | 474/133 |
| 5,045,029 | 9/1991 | Dec et al. | 474/135 X |

OTHER PUBLICATIONS

SAE Technical Paper Series, "Analysis of Synchronous Belt Vibration in Automotive Valve Track", Mar. 4, 1988.

*Primary Examiner*—Thuy M. Bui
*Attorney, Agent, or Firm*—H. W. Oberg; C. H. Castleman, Jr.; J. L. Isaac

[57] ABSTRACT

A method for tensioning a synchronous toothed belt with the tensioner so as to substantially inhibit movements of the pivot arm as attributed to dynamic tension variations in a belt drive system while damping movements of the arm. A method for tensioning a synchronous belt drive with the tensioner by biasing a moveable pulley against the belt with a force sufficient to limit the amplitudes of resonance tension variations and damping the biasing of the pulley to prevent substantially most cyclic movements of the pivot arm while simultaneously accommodating thermal changes in drive length.

4 Claims, 1 Drawing Sheet

BELT TENSIONING METHOD

This is a division of application Ser. No. 07/588,633 filed Sep. 26, 1990, now U.S. Pat. No. 5,098,347.

BACKGROUND OF THE INVENTION

The invention relates to a method of tensioning, but more particularly, the invention relates to a method that may be used for a synchronous belt drive system. While the tensioner of the invention may be used in different belt drive system applications, it is particularly useful in solving belt tension problems associated with camshaft belt drive systems for automotive applications.

Synchronous belt systems, like most mechanical systems, include components with inertias and elasticities and, as a result, such belt systems are capable of vibration and can be characterized from a vibration point of view, by natural frequencies. The most important type of system vibration that relates to the invention is angular vibration where angular vibration is for example, the oscillation of pulleys about their axes of rotation superimposed over relatively constant angular velocities of those pulleys of the system.

Vibrations can be detrimental to the system operation. The worst condition may occur at system resonance when the forces associated with pulley motion (ie., angular vibration) oscillate with a frequency equal to the system natural frequency.

In a camshaft drive system, a synchronous belt is entrained around pulleys that include at least two toothed pulleys. One of the pulleys is a crank pulley and the other is one or more camshaft pulleys that induce cyclic torque variations into the drive system. An idler pulley such as a back side idler pulley is pressed against the belt to effect an installed belt tension.

The one or more camshafts of an automotive belt drive operate over a range of frequencies and induce cyclic torque variations into the drive system. At the frequency of torque variation equal to the system natural frequencies the resonance will occur. Such resonance frequencies will vary with different engine designs. The torque variations contribute to exciting forces that introduce maximum amplitudes of tension variation in the belt at the resonance frequencies. The amplitudes of high tension occur as the camshaft pulleys move dynamically in an opposite direction or at a slower or opposite angular rate than the crankshaft pulley. When the amplitudes of vibration are too high, belt failure may occur by the teeth being sheared off of the synchronous belt at the crank pulley.

It is common practice in many synchronous belt drive systems to minimize the amplitude of maximum resonance tension variations in the system spans by means of a fixed idler pulley. An installation belt tension at a room temperature is chosen to inhibit the amplitude of the variations to prevent belt tooth failure and avoid tooth jump (ie., ratcheting). If the tension is too low, tooth failure and tooth jump can occur. If installation tension is too high, it can introduce shortened belt life and belt noise at engine operating temperatures. The fixed idler pulley must operate over a range of temperature conditions. There is a change in pulley center distance between a cold engine such as usually occurs during engine start up and a warm or thermally expanded engine such as occurs during normal engine operating temperatures. Thus, the thermal effect is to increase belt tension with engine temperature increases and conversely decrease belt tension with decreases in engine temperature.

The advantage of a fixed idler is that it operates without substantially effecting stiffness of the belt drive system to minimize resonance tension variations due to dynamic effects as introduced by torque variations in the drive. The disadvantage of a fixed idler system is that it is often difficult to consistently set installation belt tensions at a desirable level. System natural frequency and amplitude of vibration at the resonance depends on the belt installation tension. If the tension is too low, resonance will occur which can contribute to dynamic belt failure. If the tensions are too high, noise will result along with belt failure due to over tensioning. A more detailed explanation of the above discussed vibration associated with dynamic characteristics of an automotive camshaft drive system appear in SAE Technical Paper Series No. 880077 by Mizuno, et al.

It might appear to the unskilled that belt tensioners for automotive vehicle accessory such as for example those shown in U.S. Pat. No. 4,299,584 should provide a solution to overcome the variations attributable to thermal and dynamic effects associated with an automotive synchronous drive. Such tensioners are unsatisfactory as being "too soft" because they easily move in an attempt to compensate for belt tension changes as associated with tension variations introduced by cyclic torque variations of the cams. Such accessory drive tensioners adjust to variations in belt tensions by moving an idler pulley against a belt. The movements of the idler pulley are damped to inhibit the amplitude of tensioner vibrations. The damping torque is usually less than 35 percent of the damping force that is effected by the tensioner in maintaining a drive tension. Consequently, the trend for tensioners that accommodate both dynamic and thermal conditions in an automotive camshaft drive are of the hydraulic type such as, for example, shown in U.S. Pat. No. 4,883,446. While such hydraulic tensioners overcome the problem of a fixed idler as is associated with thermal expansion, installation tension, and over tensioning that may cause noise, they also introduce their own problems. Such tensioners are usually very expensive, and they depend on an oil system for pressurizing the actuator which system may fail causing either an over tensioning or under tensioning the belt.

SUMMARY OF THE INVENTION

In accordance with the invention, a tensioner is provided that is useful in conjunction with belt drive systems and is particularly useful in a synchronous belt drive system to compensate or handle tension variations attributable to dynamic effects such as those introduced by cyclic torque variations at a pulley in the drive system, or thermal effects such as those that introduce a change in the length of a synchronous belt drive. The invention also relates to a method of tensioning a synchronous belt drive system so as to compensate for thermal and dynamic effects on belt tension as well as belt stretch and wear.

The belt tensioner of the invention is of the pivot type with an idler pulley rotatably mounted to a pivot arm, a spring to bias movement of the arm, and a damping means with a leg extension of the pivot arm for inhibiting movement of the arm where the damping force is sufficient to inhibit arm movements under some dynamic conditions. When used in a synchronous belt drive system, the tensioner has a spring means for biasing the moveable pulley against the belt with a force to limit the amplitude of vibration at resonance that may be introduced into the belt such as by cyclic torque variations. The damping in such a belt drive system is sufficient for inhibiting movement of the pulley with the damping force that is greater than the dynamic exciting force at the tensioner.

A method of the invention involves biasing a moveable idler pulley against a belt of a synchronous belt drive system with a sufficient force to limit amplitudes of resonance tension variations in the system and damping the vibration of the moveable idler pulley with substantially a brake so as to prevent most movements of the arm attributable to dynamic effects while permitting movements of the arm associated with thermal effects.

An object of the invention is to provide a spring biased tensioner that is suitable for use in a belt drive system and, particularly, a synchronous belt drive system where there are thermal and dynamic belt tensioning effects.

Another object of the invention is to provide an inexpensive spring type belt tensioner that is capable of handling thermal and dynamic tension effects as well as belt stretch and wear effects in a synchronous belt drive system and which also provides suitable stiffness for the drive to inhibit effects attributable to high tension amplitudes associated with the resonance of the drive system.

These and other objects or advantages of the invention will be apparent after reviewing the drawings and description thereof wherein.

DESCRIPTION OF PREFERRED EMBODIMENTS

Figure 1:
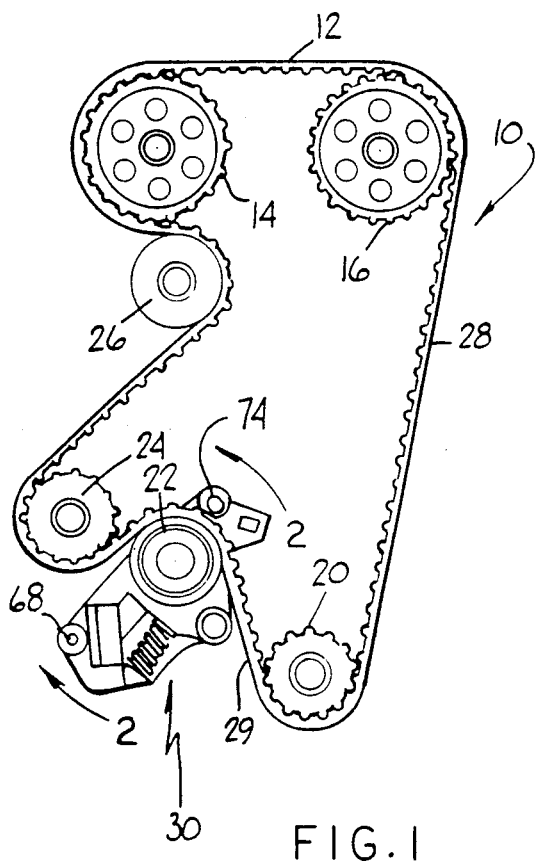
FIG. 1 is a schematic front view of the synchronous belt drive system of the automotive type and which includes a belt tensioner of the invention.

While the various features of the tensioner, belt drive system, and method of the invention are perhaps best described with a synchronous belt drive for an automotive engine, many features of the invention may also be used in other belt tensioning applications such as automotive front-end accessory drives. Referring to FIG. 1, a synchronous belt drive system 10 is shown with a toothed belt 12 entrained and tensioned around toothed pulleys. The illustrated drive system is a camshaft drive of the automotive type that includes two toothed cam pulleys 14, 16, a crank pulley 20, a tensioning pulley 22, a toothed water pump pulley 24 and a stationery idler pulley 26.

As an automotive drive system, the pulleys operate over a range of frequencies following the operating RPM of the automotive engine and the camshaft pulleys introduce cyclic torque variations into the drive. While some cyclic torque variations may be introduced at the crank pulley due to piston strokes of the engine, they are substantially minor in comparison to those introduced by the camshaft pulleys. However, torque variations introduced into the belt are reflected at the driver pulley where working conditions for belt teeth are most difficult due to the small diameter of the crankshaft pulley and small number of teeth in mesh. The variations in torque contribute to an exciting forces that introduce amplitudes of tension variations over the range of operating frequencies in spans 28, 29 of the belt. As an automotive belt drive system, there are thermal growth changes of the engine that have an effect on belt tension which are in addition to those attributable to dynamic tension variations. A tensioner 30 of the invention compensates for thermal and dynamic belt tension changes while maintaining a "stiff" drive system as is later explained in greater detail in conjunction with the operation of the tensioner.

Figure 4:
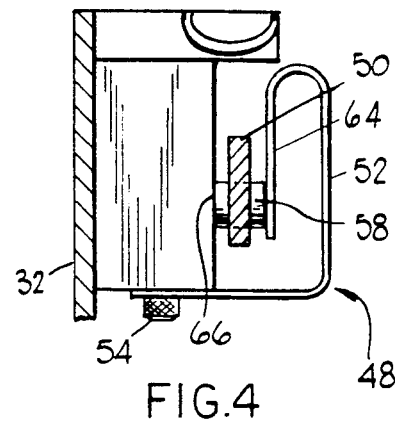
FIG. 4 is a view taken along the broken line 4—4 of FIG. 2.
Figure 3:
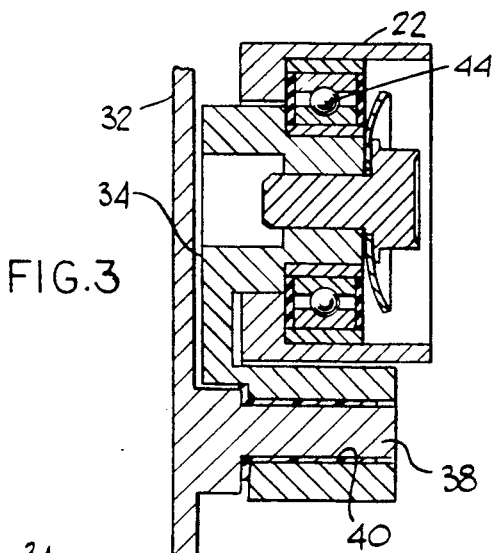
FIG. 3 is a view taken along the line 3—3 of FIG. 2.
Figure 2:
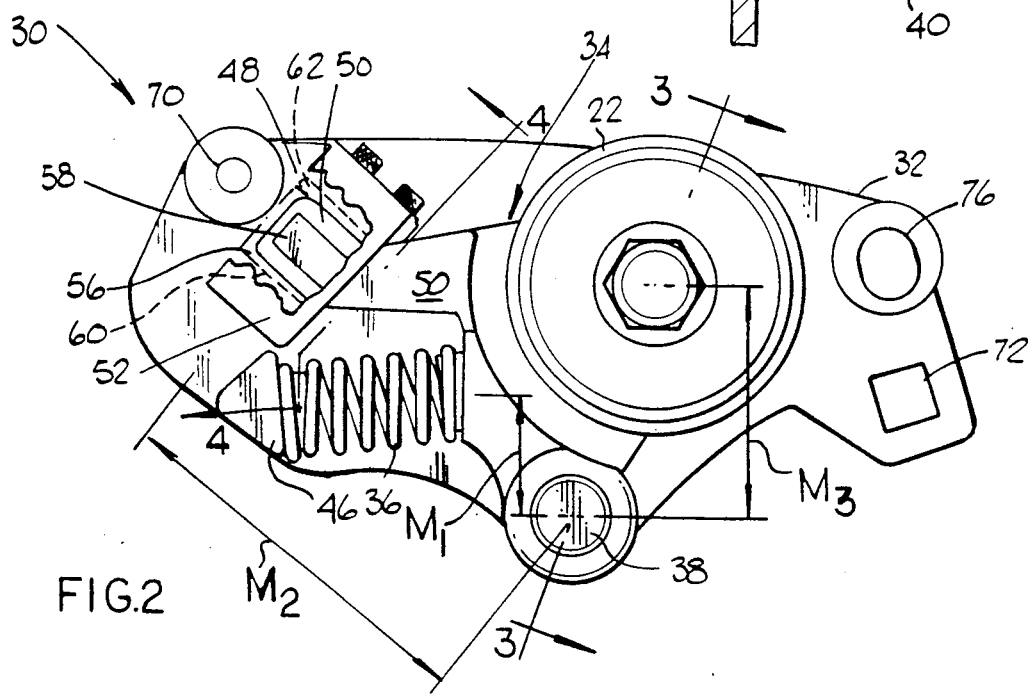
FIG. 2 is a view taken generally along the line 2—2 of FIG. 1 showing an enlarged partially broken away view of a belt tensioner of the invention.

Referring to FIGS. 2-4, a belt tensioner 30 of the invention is of the spring biased type and includes a pivot support structure 32, an arm structure 34 and a spring 36 biased between the support structure and arm structure. The arm structure 34 is pivotably mounted to the support structure by means of a pivot 38 and an optional self-lubricating polymeric sleeve-type bearing 40 that includes a thrust flange 42.

The pulley 22 is rotatably mounted to the arm such as by means of a roller bearing 44 and is operative at a moment arm M3 from the pivot as the pulley moves with the arm structure in pressing engagement against the belt.

The spring is preferably in the form of a compression spring and is interpositioned between a post 46 of the support structure and the spring is operative at a moment arm M1 in relation to the pivot 38.

A damping means 48 is included for inhibiting movement of the arm and hence the pulley against the belt when in use. The damping means includes a leg extension 50 of the arm structure, a damping spring 52 attached 54 to the support structure, a surface 56 of the support structure and a pad 58 of friction material. The leg 50 as an extension of the arm structure, pivotably moves therewith and defines an arcuate damping zone as bounded by dotted lines 60, 62 as illustrated in FIG. 2. The damping spring may be a compression spring or is preferably in the form of a U-shaped leaf spring with a leg portion 64 juxtaposed the damping zone.

While the pad 58 of friction material could be attached to the surface 56 of the support structure or the leg 64 of the spring 52, it is preferably carried by the leg 50. It is preferred that the leg have an aperture 66 and that the pad of friction material be disposed in the aperture and protrude at its opposite ends from oppositely facing sides of the leg portion. In such an arrangement, the opposite ends of the pad are in friction surface sliding contact with the face 56 of the support structure and leg 64 of the spring. An advantage of positioning the friction material in the aperture of the leg is that it defines a means to adjust to a zero clearance between the arcuate movement of the leg portion and the surface of the support structure. The pad of friction material may be of any chosen type but it optionally may be in the form of a polymeric material such as that sold under the trademark Delrin which exhibits a starting (static) friction that is less than its sliding (dynamic) friction.

The leaf spring 52 in contact with the polymeric pad and surface provides substantially a constant damping force at a moment arm M2 in relation to the pivot 38. Preferably, the moment arm M2 for the damping means is greater than the operative moment arm M1 for the spring means to minimize the damping spring force while simultaneously precisely controlling the damping torque of the tensioner. Optionally, the moment arm M2 for the damping means is also greater than the moment arm M3 for the pulley 22.

As illustrated by the vertical alignment of FIGS. 3 and 4 of the support structure, the spring 36, the damping means 48, the rotational mount of the pulley 22 and the pivot 38 are in substantially planer alignment for the advantage of minimizing or eliminating offset moments that could occur if such elements were not in alignment. Such an arrangement has the advantage of minimizing bearing sizes, pivot sizes, spring sizes, and the like.

Method

To install a belt with the tensioner of the invention and at a precise belt tension, the belt is entrained around all of the pulleys except for the moveable pulley of the tensioner. A fastener 68 such as a bolt or pin is loosely fitted through an aperture 70 of the tensioner as the pulley 22 is loosely positioned against the back side of the belt. A lever means such as a wrench is inserted into a wrenching means such as square shaped aperture 72 and torque is applied to the support structure which in turn presses the pulley 22 against the belt and slightly compresses the spring. Another fastener such as a bolt 74 is inserted through another aperture 76 of support of the structure which is preferably elongated for easy fastener alignment. The spring 36 also operates to rotate the support structure about fasteners 68 and press the aperture 76 against the fastener 74 so that the precise installation belt tension is achieved.

As previously briefly mentioned, the selection of the biasing force to tension the belt and the damping force to inhibit movements of the tensioner are of primary importance to provide a "stiff" drive system and thereby minimize the amplitudes of system vibration. A tensioner that does not provide the requisite force and damping would result in a "soft" system that would allow substantial tensioner pulley movement which could lead to catastrophic tension variations that would destroy the belt.

In tensioning a synchronous belt drive system that operates over a range of frequencies and where there are cyclic torque variations induced into the drive system by one of the toothed pulleys, such torque variations contribute to exciting forces in the belt that introduce angular vibration. The angular vibration is controlled by the method of biasing a moveable idler pulley against the belt with a force sufficient to limit the amplitudes of the tension variations at the system resonance. The biasing force is also sufficient to induce an operative tension for the belt drive system. The idler pulley axis movement must be reduced to practically zero so that it is not a source for introducing resonance tension variations in the belt. This is done by the process of damping the reciprocal movement of the idler pulley into the belt and braking most of the reciprocal movement of the pulley from the exciting forces induced into the belt by these cyclic torque variations. However, the damping process simultaneously permits accommodating thermal growth changes in the drive system by permitting change of the position of the idler pulley. It has been determined that a substantial amount of damping is required over that of the spring type accessory drive tensioners of the prior art. The damping torque should be from bout 35 percent to less than 100 percent of the damping torque reacted by the idler pulley by the belt. More preferably, the damping torque is from about 40 percent to about 60 percent of the reactive torque at the idler pulley. With such damping, there is sufficient resistance to brake substantially all cyclic movements of the idler pulley while also permitting small change of the position of the idler pulley when the belt tension exceeds the spring and damping force reflected at the pulley. By applying a damping force to the idler pulley, whose value is just greater than the difference between the dynamic force applied to the idler pulley by mean belt tension and that applied by the maximum deviation from the mean tension, the tensioner remains substantially rigidly locked in position and will act as a fixed idler. An incremental shift in mean belt tension will result in the increment tension plus the maximum deviation in tension exceeding the opposing spring and frictional force, and this will cause the tensioner to move or "creep" until the belt force is again no greater than the spring and frictional force whereupon the "creep" stops. The result is good tension control without an undesirable softening of the system.

To illustrate the effectiveness of the tensioner, synchronous belt drive system, and method, a tensioner of the invention was installed as a replacement for a fixed idler pulley of a toothed belt camshaft drive of an automotive engine where the engine was required to operate between about 750 rpm and 5500 rpm.

In the prior art fixed idler pulley system, the initial belt tension for a cold engine, ie., room temperature 70° F. was set for 40 lbs tension; under warm engine temperatures, ie., approximately 200° F., the nominal belt tension increased to approximately 80 lbs. During engine warm up, belt tension variations of 153 lbs were observed at the belt tensioner at an engine speed of 2500 rpm. The variation reduced to 74 lbs at 2500 rpm at engine operating temperature.

When a tensioner of the invention was installed in drive to provide a cold tension of 80 lbs and where the damping force was about 40 percent of the tensioning force, variations in tension remained at approximately 74 lbs while the engine reached its operating conditions. Only minor movements of the pivot arm were observed as the tensioner adjusted its arm position for changing thermal conditions and tension in the belt.

The foregoing detailed description is made for the purpose of illustration only and is not intended to limit the scope of the appended claims.

What is claimed is:

1. A method of tensioning a synchronous belt drive system of the type with a toothed belt entrained and tensioned around pulleys including at least two toothed pulleys that operate over a range of frequencies where there are cyclic torque variations induced into the drive system by at least one of the toothed pulleys and which torque variations contribute to exciting forces that introduce high amplitudes of variations at system resonance within the operating range of frequencies in spans of the belt, the method comprising the steps of:

biasing a moveable idler pulley against the belt with a force sufficient to limit the amplitudes of the resonance tension variations in the spans while simultaneously tensioning the belt and inducing an operative tension in the belt drive system; and damping reciprocal motion of the moveable idler pulley and braking substantially all movements of the pulley against substantially all exciting forces induced into the belt spans by the cyclic torque variations while simultaneously allowing the moveable pulley to move and accommodating thermal length changes in the drive while maintaining operative tension.

2. The method of tensioning as claimed in claim 1 wherein the biasing step includes compressing a compression spring at a moment arm against a pivoting arm structure that rotatably mounts the idler pulley and pressing the idler pulley into engagement with the belt.

3. The method of tensioning as claimed in claim 2 wherein the damping step includes frictionally restraining movement of the pivoting arm structure by friction surface sliding.

4. The method of tensioning as claimed in claim 3 wherein the restraining step includes sliding a pad of friction material with the arm structure and at a moment arm from the pivot that is greater than the operative moment arm of the compression spring.

* * * * *